(12) United States Patent
Ishihara et al.

(10) Patent No.: US 6,812,790 B2
(45) Date of Patent: Nov. 2, 2004

(54) SIGNAL READ CIRCUIT

(75) Inventors: Masatoshi Ishihara, Hamamatsu (JP);
Hiroo Yamamoto, Hamamatsu (JP);
Seiichiro Mizuno, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 242 days.

(21) Appl. No.: 10/204,916

(22) PCT Filed: Feb. 28, 2001

(86) PCT No.: PCT/JP01/01510
§ 371 (c)(1),
(2), (4) Date: Aug. 27, 2002

(87) PCT Pub. No.: WO01/65840
PCT Pub. Date: Sep. 7, 2001

(65) Prior Publication Data
US 2003/0011407 A1 Jan. 16, 2003

(30) Foreign Application Priority Data
Feb. 29, 2000 (JP) .................................. 2000-054737

(51) Int. Cl.[7] .............................. H03F 1/30; H03F 1/56; G01R 1/44

(52) U.S. Cl. ........................... 330/143; 327/72; 327/90; 327/91; 327/98

(58) Field of Search ................................. 330/143, 147; 327/50–54, 56, 72, 77, 90, 91, 93, 94, 95, 96, 98

(56) References Cited

FOREIGN PATENT DOCUMENTS

| JP | 62-176207 | 8/1987 |
|---|---|---|
| JP | 10-336526 | 12/1998 |
| JP | 2000-312182 | 11/2000 |

*Primary Examiner*—Evan Pert
(74) *Attorney, Agent, or Firm*—Morgan, Lewis & Bockius LLP (57) ABSTRACT

In a signal read circuit including a plurality of circuit rows each having a charge amplifier connected to a photoelectric conversion element PD and a CDS circuit 2S for performing correlated double sampling for an output from the charge amplifier, a dummy circuit row DMY having the same configuration as a circuit row SLT is connected in parallel with this circuit row SLT. By calculating the difference between these circuit rows connected in parallel, offset variations generated in the two circuit rows SLT and DMY can be removed.

9 Claims, 10 Drawing Sheets

Fig.13

SIGNAL READ CIRCUIT

TECHNICAL FIELD

The present invention relates to a signal read circuit for reading out an output from a photoelectric conversion element which is a solid-state image sensor such as an image pickup device or a MOS image sensor and, more particularly, to a signal read circuit for reading out an output from a photodiode array which monitors light transmitted through an optical fiber by wavelength division multiplexing by demultiplexing the light into a plurality of components.

BACKGROUND ART

The present inventors have proposed a signal read circuit for reading out an output signal from a photodiode array. This signal read circuit is described in Japanese Patent Laid-Open No. 10-336526. Recently, WDM (Wavelength Division Multiplexing) optical communication has attracted attention, and the development of an apparatus which demultiplexes an output from an optical fiber into different wavelengths and monitors each wavelength component is expected.

DISCLOSURE OF INVENTION

When the individual wavelength components are input to the photodiode array, the output from the optical fiber can be monitored at each wavelength. Although the signal read circuit achieves its superior characteristics in an application like this, the characteristics are unsatisfactory and required to be further improved. Especially when in actual use the temperature of the ambient environment of the sensor changes, the output offset level fluctuates along with this temperature change. This deteriorates the absolute output accuracy. The present invention relates to improvements of this prior art, and has as its object to provide a signal read circuit capable of lowering the noise level of an output signal from a photoelectric conversion element.

To achieve the above object, a signal read circuit according to the present invention is a signal read circuit comprising a first circuit row having a charge amplifier connected to a photoelectric conversion element and a CDS circuit for performing correlated double sampling for an output from the charge amplifier, characterized by comprising a second circuit row having the same arrangement as the first circuit row and connected in parallel with the first circuit row, wherein two input terminals of the charge amplifier in the second circuit row are open, and output terminals of the first and second circuit rows are connected to a subsequent circuit such that an offset level generated in the first circuit row decreases.

In this signal read circuit, the subsequent circuit calculates the difference between the circuit rows, thereby removing offset level variations particularly generated in the two circuits when a temperature changes. This improves the offset level uniformity of an output signal from the photoelectric conversion element. Especially when this photoelectric conversion element is made of a compound semiconductor, a dark current of the photoelectric conversion element significantly differs from one element to another. When a plurality of photoelectric conversion elements are used, therefore, the offset level significantly differs from one circuit row to another. In a case like this, the difference configuration described above effectively functions to reduce variations in this offset level.

For example, when the signal read circuit further comprises a differential output circuit for outputting a difference between outputs from the first and second circuit rows, offset variations generated in these two circuit rows can be removed.

This differential output circuit can comprise a differential amplifier circuit which has an operational amplifier having an inverting input terminal, non-inverting input terminal, and output terminal, first and second resistors interposed between the outputs of the first and second circuit rows and the inverting and non-inverting input terminals, respectively, and a third resistor interposed between the output terminal and the inverting input terminal.

Also, the differential output circuit preferably comprises selecting means for selectively connecting the outputs from the first or second circuit row to one terminal of a capacitor, and a switch which, when the selecting means selects one of the first and second circuit rows to one terminal of the capacitor, connects the other terminal of the capacitor to a fixed potential, and, when the selecting means connects the other one of the first and second circuit rows to one terminal of the capacitor, disconnects the other terminal of the capacitor from the fixed potential. In this arrangement, fluctuations in the output signal level caused by temperature changes can be suppressed, since the temperature dependence of a capacitor is much lower than that of a resistor.

Instead of the differential output circuit, the signal read circuit can further comprise calculating means for calculating the difference between the outputs from the first and second circuit rows. This calculating means can be a computer.

The first and second circuit rows are preferably formed on the same semiconductor substrate. This arrangement can achieve circuit characteristics more uniform than when these circuits are formed on different substrates. When the differences between the outputs from these circuits are calculated, therefore, the offset variations can be further reduced.

In the signal read circuit, a third circuit row having an open input terminal to which no input signal is applied, and having the same configuration as that of the first circuit row, is preferably connected in parallel with the first circuit row on the semiconductor substrate. In this case, an output from this third circuit row having similar output characteristics can be used.

In particular, the first circuit row is desirably placed between the second and third circuit rows. In this case, the output from the first circuit row on the semiconductor substrate can be regarded as substantially equal to the average value of the outputs from the second and third circuit rows. Accordingly, the influence of the formation positions of these circuit rows can be suppressed. That is, the signal read circuit according to the present invention preferably comprises a differential output circuit for outputting a difference between an average value of the outputs from the second and third circuit rows and the output from the first circuit row. This differential output circuit need not be formed on the same semiconductor substrate. Additionally, the difference can also be calculated by inputting these outputs to a calculating means such as a computer.

BEST MODE OF CARRYING OUT THE INVENTION

A signal read circuit according to an embodiment will be explained below together with a semiconductor device which supplies an input signal to the signal read circuit and comprises a plurality of photoelectric conversion elements. The same reference numerals denote the same parts, and a duplicate explanation thereof will be omitted.

Figure 1:
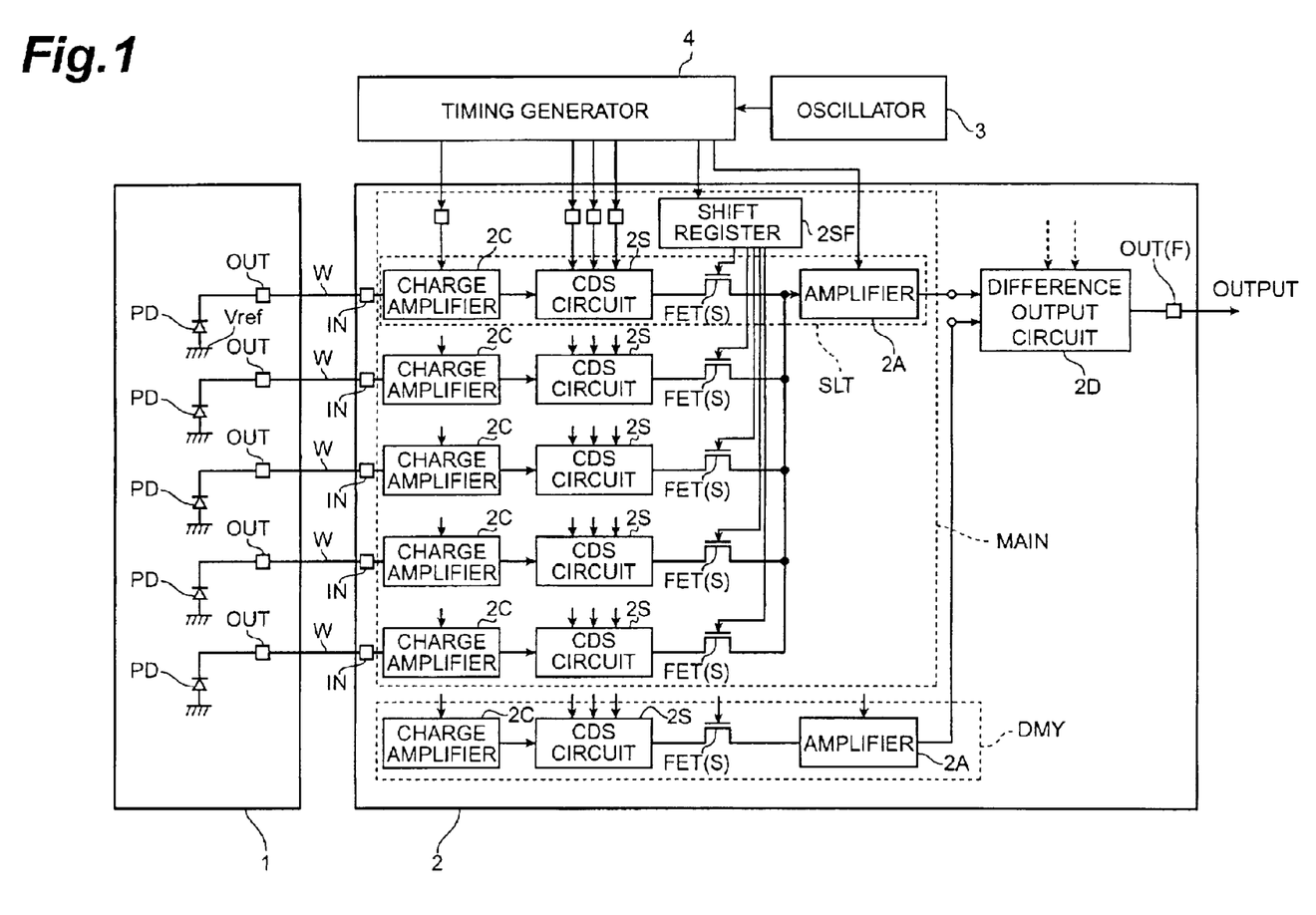
FIG. 1 is block diagram showing the configuration of a system including a semiconductor device and a signal read circuit.

FIG. 1 is a block diagram showing the configuration of a system including the semiconductor device and the signal read circuit.

This semiconductor device is fabricated by forming a plurality of photodiodes PD on a semiconductor substrate 1 made of a compound semiconductor (InGaAs). In the end portion of this semiconductor substrate, signal output electrode pads OUT connected to the individual photodiodes PD are formed.

The signal read circuit has a plurality of circuit rows in each of which a charge amplifier 2C, a correlated double sampling circuit (to be referred to as a CDS circuit 2S hereinafter) 2S, and a switch FET(S) which is a MOSFET (Field-Effect Transistor) are connected in series. The number of circuit rows is larger than the number of photodiodes PD; in this embodiment, the number of photodiodes PD is 5, and the number of circuit rows is 6. That is, five of the six circuit rows correspond to the photodiodes PD, and one of them is a dummy circuit row. A shift register 2SF sequentially switches the switches FET(S), thereby sequentially connecting these circuit rows arranged in a main circuit portion MAIN to an amplifier 2A.

The signal read circuit is formed on a semiconductor substrate 2. In the end portion of this semiconductor substrate 2, signal input electrode pads IN which function as the input terminals of the five circuit rows are formed. No electrode pad is formed for the one remaining circuit row. The semiconductor substrate 2 is made of Si, and the signal read circuit is fabricated on this substrate 2.

Note that each of the semiconductor substrates 1 and 2 can be made of a compound semiconductor or Si. Note also that each semiconductor substrate contains not only a semiconductor material but also an insulator for forming protective films and capacitors and a metal for forming interconnects.

The photodiode PD and the charge amplifier 2C are connected via the signal output electrode pad OUT, a bonding wire W, and the signal input electrode pad IN. Since the influence of the parasitic capacitance of the charge amplifier 2C can be suppressed more as the length of the bonding wire W decreases, the semiconductor device and the signal read circuit are preferably formed on the same semiconductor substrate. In this embodiment, however, the semiconductor device and the signal read circuit are formed on the different semiconductor substrates 1 and 2, respectively.

Accordingly, an output from each photodiode PD is input to the charge amplifier 2C, the CDS circuit 2S, and the switch FET(S) through the wire W, and then to a differential output circuit 2D via the amplifier 2A. Assume that the circuit row (2C, 2S, FET(S), and 2A) in which the switch FET(S) is ON is a selected circuit row SLT. The input terminal of a dummy circuit row DMY having the same configuration as this selected circuit row SLT is open, so no input signal is given to this input terminal. Noise components generated in these two circuit rows SLT and DMY are input to the differential output circuit 2D.

That is, in this signal read circuit including the first circuit row SLT having the charge amplifier 2C connected to the photoelectric conversion element PD and the CDS circuit 2S which performs correlated double sampling for an output from the charge amplifier 2C, the input terminal is open, so no input signal is given to this input terminal. In addition, the second circuit row DMY having the same configuration as the first circuit row SLT is formed in parallel with this first circuit row SLT. This means that the two input terminals of the charge amplifier in the second circuit row DMY are open. The output terminals of the first and second circuit rows SLT and DMY are connected to the subsequent circuit, so as to decrease the offset level generated in the first circuit row SLT. In this embodiment, this subsequent circuit is the differential output circuit.

In practice, the final output offset voltage in 2A of FIG. 1 varies if the temperature fluctuates in the ambient environment of the sensor owing to, e.g., a dark current generated by a parasitic diode present on the semiconductor substrate 2 in the input portion of each charge amplifier 2C, or the offset voltage temperature dependence of the amplifier 2A itself.

Since, however, offset variations of the first and second circuit rows are substantially equal, these offset variations can be reduced by calculating the difference between the outputs from these circuit rows. An offset level variation is particularly conspicuous when the photoelectric conversion element PD is made of a compound semiconductor. This circuit can effectively reduce this variation.

This difference can also be calculated by a computer or the like. However, this embodiment includes the differential output circuit 2D for outputting the difference between the outputs from the first circuit row SLT and the second circuit row DMY, thereby removing any offset variations generated in these two circuit rows. Accordingly, the offset level uniformity of output signals from the photoelectric conversion elements can be improved.

Since the first and second circuit rows SLT and DMY are formed on the same semiconductor substrate 2, it is possible to obtain circuit characteristics more uniform than when these circuit rows are formed on different semiconductor substrates. Therefore, when the difference between the outputs from these circuit rows is calculated, temperature-dependent offset variations can be well reduced.

The shift register 2SF is driven by an output pulse from a timing generator 4. This timing generator 4 generates pulse signals necessary to drive this apparatus, including the driving signal of the shift register 2SF, from a reference-frequency clock signal output from an oscillator 3 such as a quartz oscillator or a multivibrator.

Various arrangements are possible as the arrangement of each circuit element. Preferred examples of these arrangements will be explained below. Although only one of the plurality of circuit elements will be explained, the other circuit elements have the same arrangement, so a detailed description thereof will be omitted.

First, the photoelectric conversion element PD will be described below.

Figure 2:
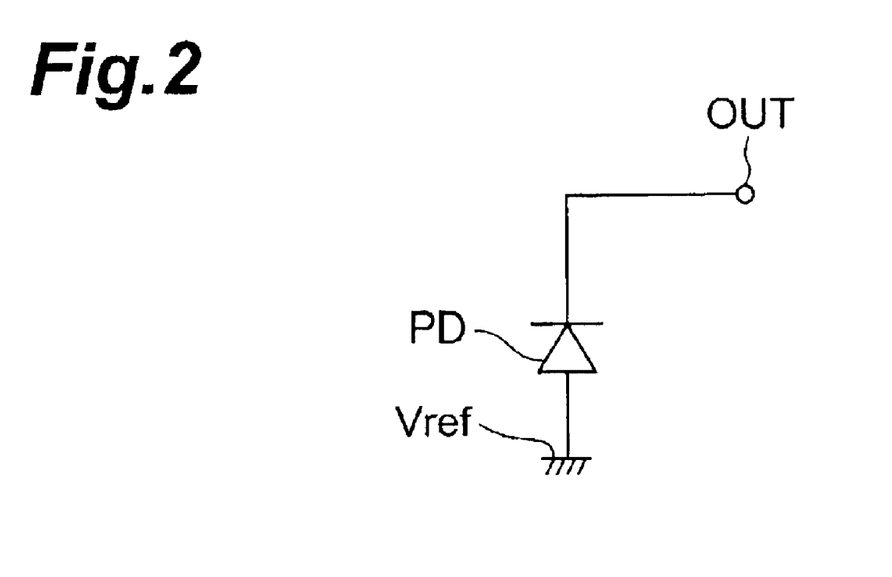
FIG. 2 is a circuit diagram showing one of photodiodes PD used in the semiconductor device.
Figure 3:
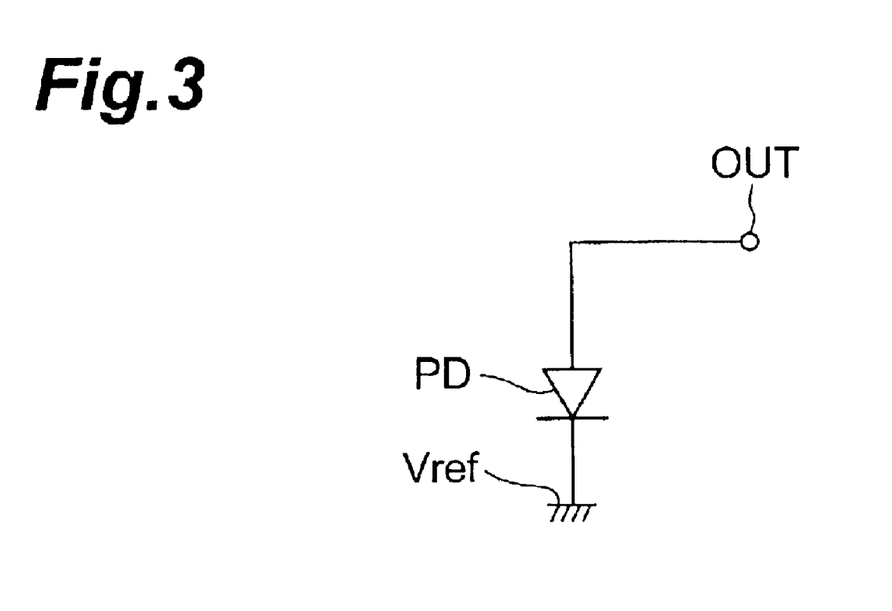
FIG. 3 is a circuit diagram showing one of the photodiodes PD used in the semiconductor device.

Each of FIGS. 2 and 3 is a circuit diagram showing one of the photodiodes PD used in the semiconductor device described above. Referring to FIG. 2, the anode of the photodiode PD is grounded, while its cathode is connected to the output terminal OUT. Referring to FIG. 3, the cathode of the photodiode PD is grounded, while its anode is connected to the output terminal OUT.

In FIGS. 2 and 3, the potential of one of the anode and cathode is a fixed potential (ground potential) Vref. However, this potential Vref can also be another fixed potential, e.g., ½ the power supply potential (VDD) of the signal read circuit.

To use the photodiode PD shown in each of FIGS. 2 and 3, a reverse bias or zero bias is applied to the photodiode PD. That is, the cathode potential is set to be higher than or equal to the anode potential.

The photoelectric conversion element can also be an element, such as a CCD, in which electric charge is stored in accordance with incidence of light into a potential well formed in the surface of a semiconductor substrate. Furthermore, a photomultiplier tube can be used as the photoelectric conversion element.

The charge amplifier 2C will be described next.

Figure 4:
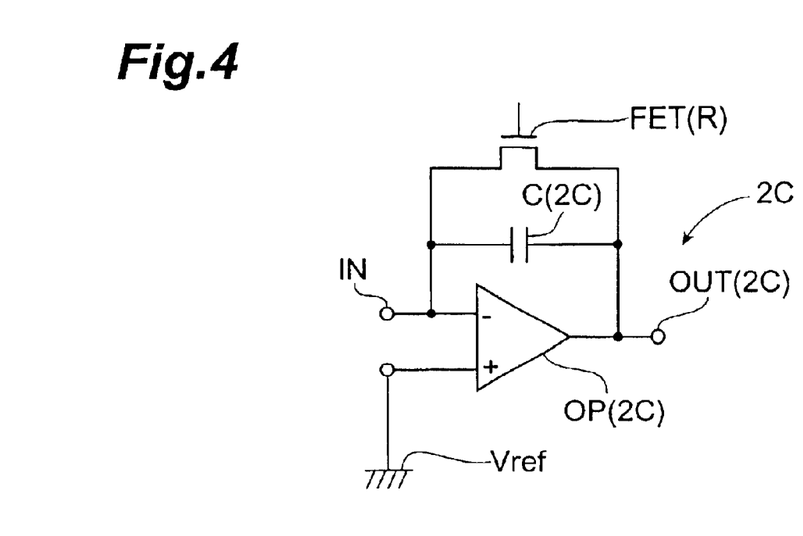
FIG. 4 is a circuit diagram of a charge amplifier 2C.

FIG. 4 is a circuit diagram of the charge amplifier 2C. This charge amplifier 2C includes an operational amplifier OP(2C). The non-inverting input terminal of this operational amplifier OP(2C) is connected to the fixed potential Vref. The inverting input terminal of the operational amplifier OP(2C), to which an output from the photodiode PD is input via the electrode pad IN, is connected to an output terminal OUT(2C) via a capacitor C(2C).

That is, the output of the operational amplifier OP(2C) is fed back to the input via the capacitor C(2C). A switch FET(R) for reset is connected in parallel with the capacitor C(2C). When this switch FET(R) is connected (ON), the capacitor C(2C) is short-circuited (reset); when the switch FET(R) is disconnected (OFF), electric charge is stored in the capacitor C(2C) (the capacitor C(2C) is set in a storage state).

The power supply voltage VDD and the fixed potential Vref of the charge amplifier C are so set that a reverse bias or zero bias is applied to the photodiode PD.

The CDS circuit 2S will be explained below.

Figure 5:
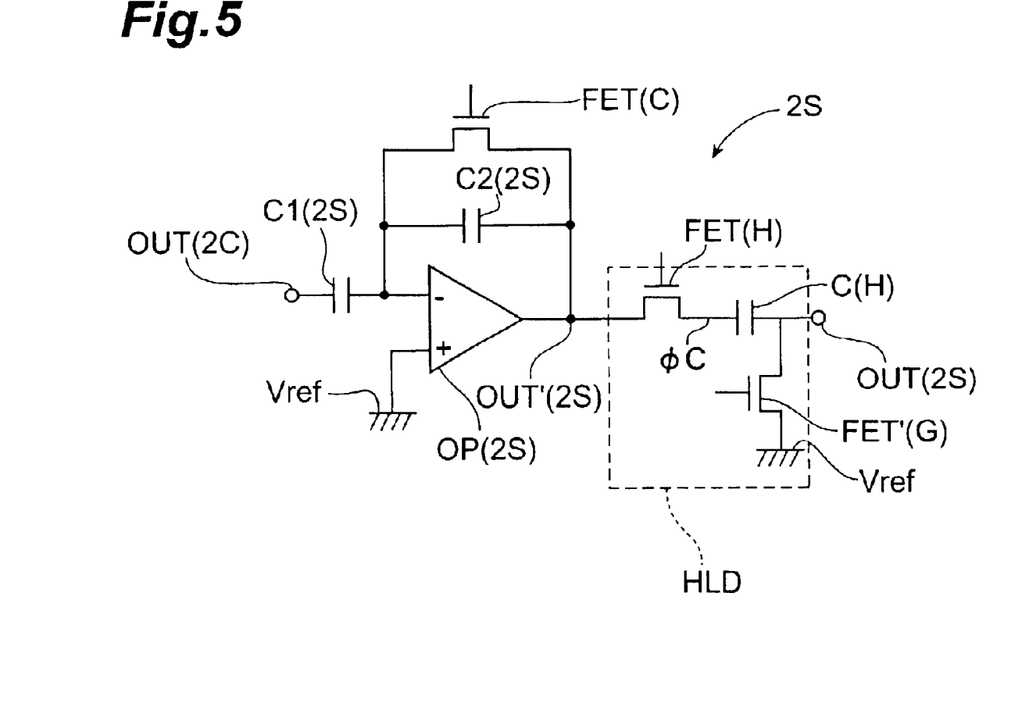
FIG. 5 is a circuit diagram of a CDS circuit 2S.

FIG. 5 is a circuit diagram of this CDS circuit 2S. The CDS circuit 2S of this embodiment includes a sample and hold circuit HLD. The CDS circuit 2S has an input (inverting input terminal) connected to the output OUT of the charge amplifier 2C in the preceding stage, and a capacitor C1(2S) connected between this input terminal and an operational amplifier OP(2S). The output of the operational amplifier OP(2S) is fed back to the input via a capacitor C2(2S). The non-inverting input terminal of the operational amplifier OP(2S) is connected to the fixed potential Vref. A switch FET(C) for clamping is connected in parallel with the capacitor C2(2S). When this switch FET(C) is connected (ON), the capacitor C2(2S) is short-circuited (clamped); when the switch FET(C) is disconnected (OFF), electric charge is stored in the capacitor C2(2S) (the capacitor C(2S) is set in a storage state).

When the charge amplifier 2C is reset and the CDS circuit 2S is clamped, an offset level of the charge amplifier 2C appears at the output OUT(2C) of the charge amplifier 2C. If immediately after that the charge amplifier 2C is set in the storage state while the CDS circuit 2S is kept clamped and then the CDS circuit 2S is set in the storage state, electric charge proportional to a potential change in the output terminal OUT(2C) since the CDS circuit 2S is set in the storage state is stored in the capacitor C2(2S), thereby eventually removing the offset level from this output. That is, correlated double sampling is performed.

An output OUT'(2S) of the operational amplifier OP(2S) is held by the sample and hold circuit HLD. More specifically, the electric charge stored in the capacitor C2(2S) is stored in a holding capacitor C(H) by connecting (turning on) a switch FET(H) on the input side of the sample and hold circuit HLD. After that or at the same time, a switch FET'(G) present between one terminal of the output side of the holding capacitor C(H) and the fixed potential Vref is connected, thereby setting this terminal of the output side of the holding capacitor C(H) at the fixed potential Vref. Subsequently, the two switches FET(H) and FET'(G) are disconnected to hold the electric charge such that one terminal of the input side of the holding capacitor C(H) is at a potential $\phi$C. After that, the main body portion of the CDS circuit 2S is clamped. However, this portion is disconnected from the sample and hold circuit HLD and hence has no influence on the held electric charge.

The final-stage amplifier 2A will be described below.

Figure 6:
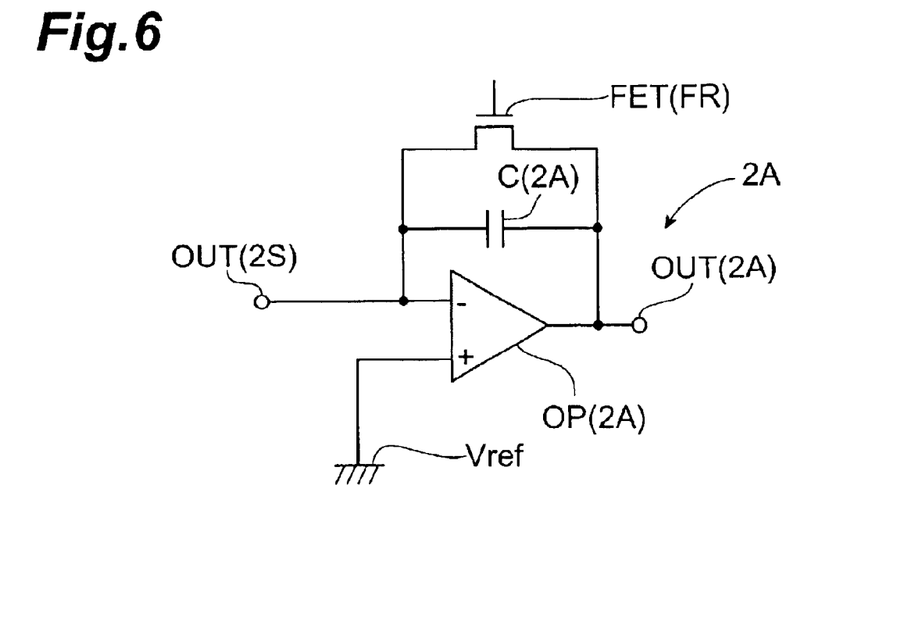
FIG. 6 is a circuit diagram of a final-stage amplifier 2A.

FIG. 6 is a circuit diagram of the final-stage amplifier 2A. The output OUT(2S) of the CDS circuit 2S having the sample and hold circuit HLD is the input (inverting input terminal) of the final-stage amplifier 2A. These output and input are connected by connecting (turning on) a switch FET(S) for circuit row selection present between them. The configuration of the final-stage amplifier 2A is the same as the charge amplifier 2C; instead of the operational amplifier OP(2C), the capacitor C(2C), and the reset switch FET(R) in the charge amplifier 2C, the final-stage amplifier 2A includes an operational amplifier OP(2A), a capacitor C(2A), and a reset switch FET(FR). By turning on and off the reset switch FET(FR), the final-stage amplifier 2A functions similar to the charge amplifier 2C, and outputs to the output OUT a potential proportional to the output from the CDS circuit 2S.

The differential output circuit 2D will be described below.

Figure 7:
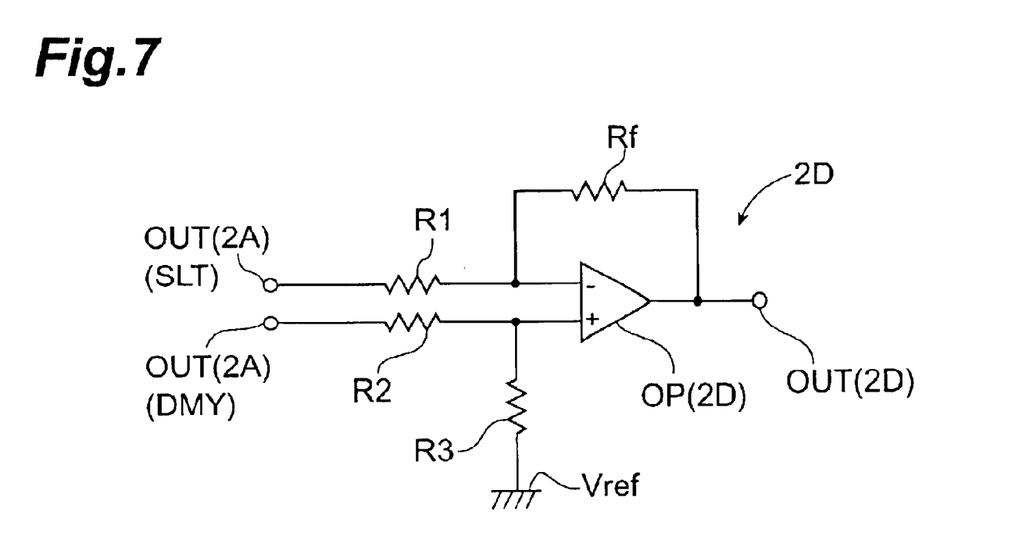
FIG. 7 is a circuit diagram showing an example of a differential output circuit 2D.

FIG. 7 is a circuit diagram showing an example of the differential output circuit 2D. This differential output circuit 2D has an operational amplifier OP(2D) having an inverting input terminal, non-inverting input terminal, and output terminal. The outputs from the first and second circuit rows described above, i.e., the output from the final-stage amplifier 2A connected to the circuit row SLT selected by the selecting means FET(S) and the output from the final-stage amplifier 2A in the dummy circuit row DMY are input to the input terminals of the operational amplifier OP(2D) via resistors R1 and R2. The output of this operational amplifier OP(2D) is fed back to the input via a feedback resistor Rf. The non-inverting input terminal of the operational amplifier OP(2D) is connected to the fixed potential Vref.

That is, this differential output circuit 2D is a differential amplifier having the first and second resistors R1 and R2 interposed between the input terminal of the operational amplifier OP(2D) and the outputs of the circuit rows SLT and DMY, respectively, and the third resistor Rref interposed between the output terminal and the inverting input terminal of the operational amplifier OP(2D). The differential output circuit 2D outputs the difference between the input voltages from the output terminal OUT(2D).

Figure 8:
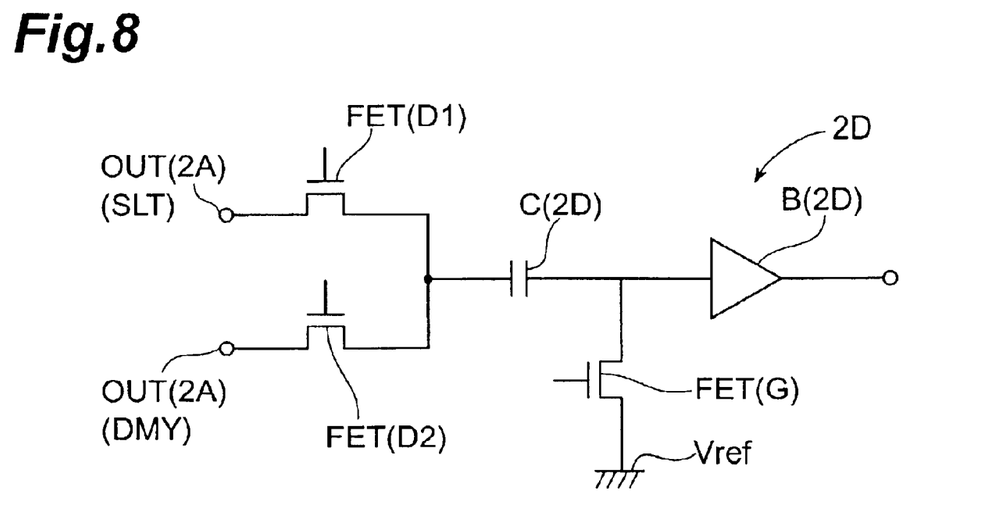
FIG. 8 is a circuit diagram showing another example of the differential output circuit 2D.

FIG. 8 is a circuit diagram showing another example of the differential output circuit 2D. This differential output circuit 2D includes selecting means FET(D1) and FET(D2) for selectively connecting the output from the first circuit row SLT or the second circuit row DMY to one terminal of a capacitor C(2D). These selecting means FET(D1) and FET(D2) are switches such as FETs. By turning on and off the switches FET, the circuit rows SLT or DMY is connected to the capacitor C(2D).

When one of the first circuit row SLT and the second circuit row DMY is connected to one terminal of the capacitor C(2D) in a period T1, a switch FET(G) of this differential output circuit 2D connects the other terminal of the capacitor C(2D) to the fixed potential Vref.

When the other one of the first circuit row SLT and the second circuit row DMY is connected to one terminal of the capacitor C(2D) in a period T2 after the period T1, the switch FET(G) of the differential output circuit 2D disconnects the other terminal of the capacitor C(2D) from the fixed potential Vref. The timings of connection and disconnection are the same, or the disconnection timing is slightly earlier. Accordingly, the potential at the other terminal of the capacitor C(2D) becomes proportional to the potential difference between the output signals from the first and second circuit rows SLT and DMY. This potential is output to the outside via a buffer amplifier B(2D) connected to the subsequent stage.

In this differential output circuit 2D, the temperature dependence of the capacitor is much lower than that of the resistor. Therefore, fluctuations of the output signal level caused by temperature changes can be suppressed more than in the aforementioned differential output circuit.

Figure 9:
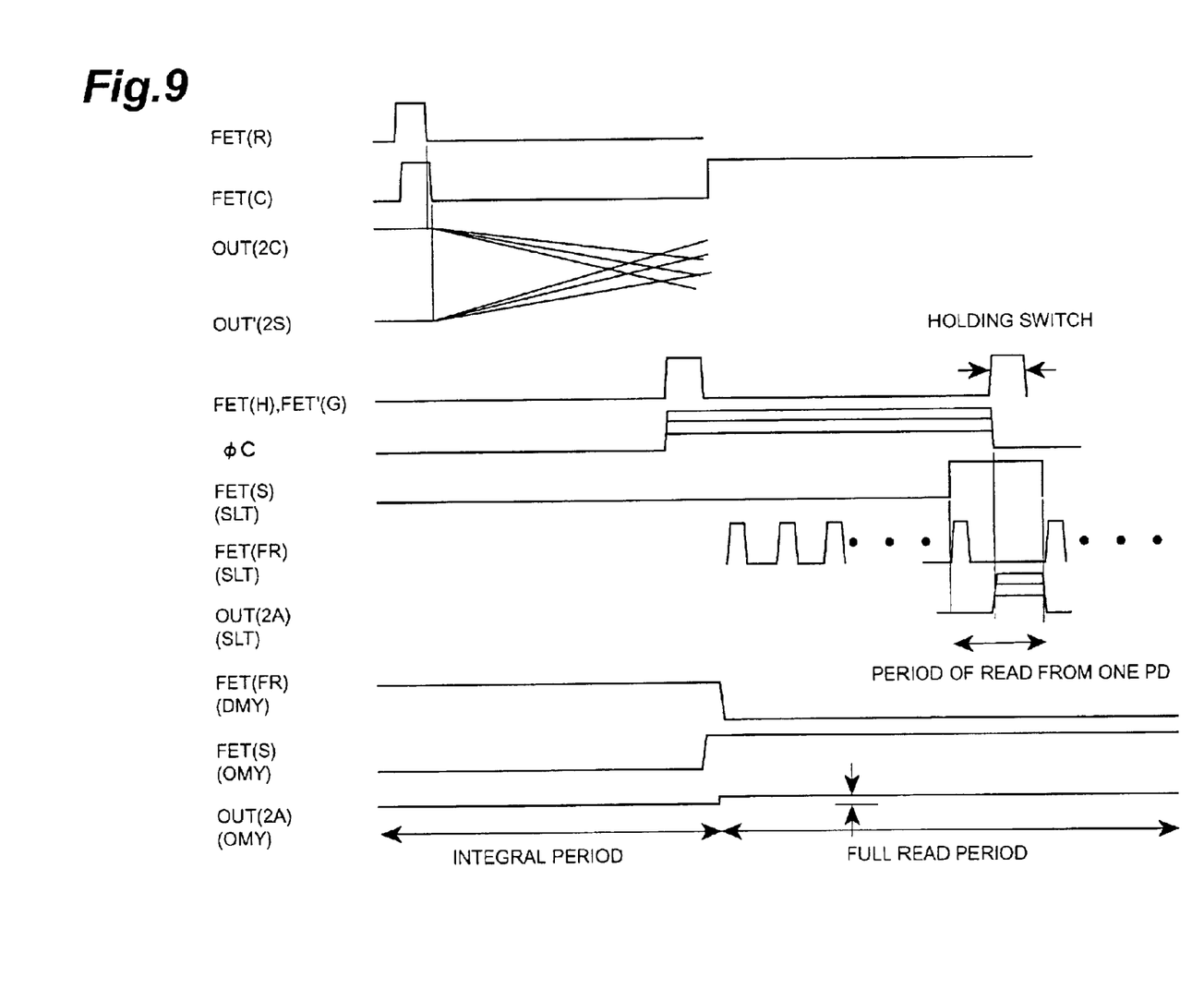
FIG. 9 is a timing chart in the signal read circuit when the differential output circuit 2D shown in FIG. 7 is used.
Figure 10:
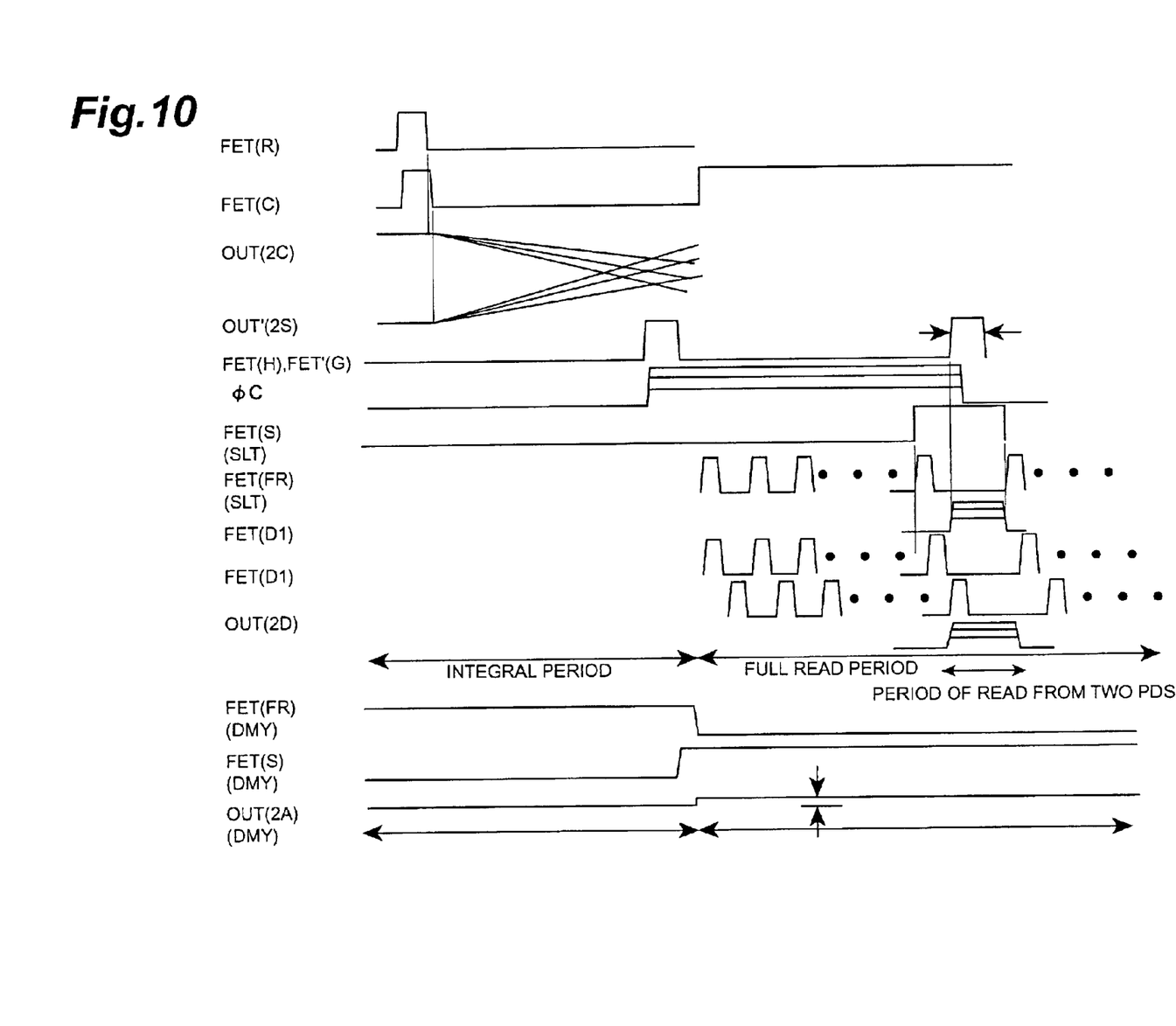
FIG. 10 is a timing chart in the signal read circuit when the differential output circuit 2D shown in FIG. 8 is used.

FIGS. 9 and 10 are timing charts of the potentials in the signal read circuit when the differential output circuits 2D shown in FIGS. 7 and 8 are used. These timings are generated by the timing generator 4 (FIG. 1). Note that the timings relating to the selected circuit row SLT are described with SLT attached, and those relating to the dummy circuit DMY are described with DMY attached. Electric charges from the plurality of photodiodes PD are stored in the individual circuit rows at the same time by the charge amplifiers 2C and the CDS circuits 2S during an integral period shown in FIGS. 9 and 10. The stored electric charges are held by connecting and disconnecting the switches FET(H) and FET'(G), and sequentially read out from the circuit rows.

In the above configuration, the potential difference between the selected circuit row SLT and the dummy circuit row DMY is output by using the differential output circuit 2D. However, the following configuration can also be used.

Figure 11:
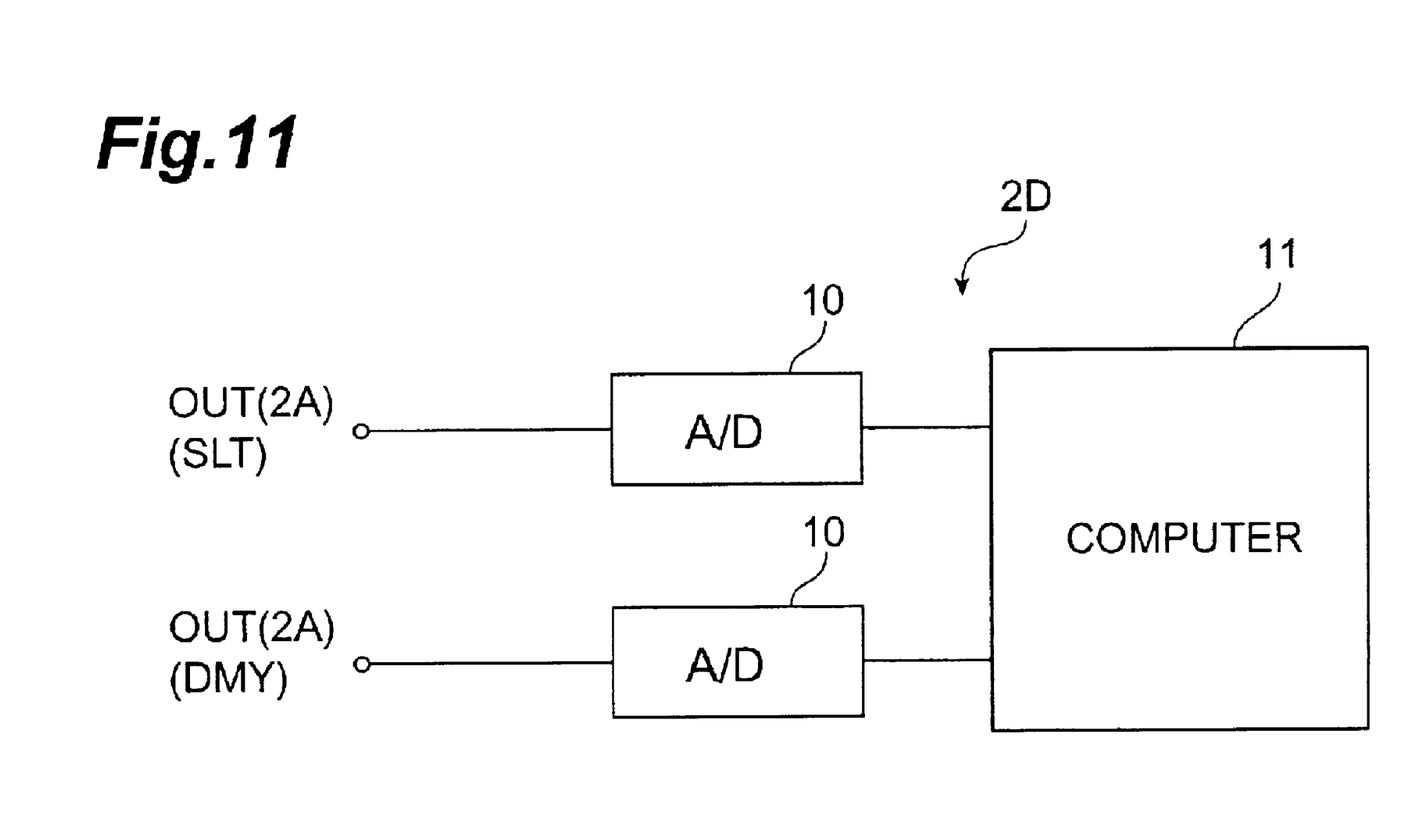
FIG. 11 is a block diagram showing another system configuration for calculating a difference.

FIG. 11 is a block diagram showing another system configuration for obtaining the difference. The outputs OUT (2A) of the final-stage amplifiers 2A in the selected circuit row SLT and the dummy circuit row DMY are input to A/D converters 10 connected in parallel. After being converted from analog signals into digital signals, these outputs are input to a computer 11. This computer 11 calculates the difference between the outputs, indicated by the two input digital signals, from the circuit rows SLT and DMY. That is, instead of the differential output circuit 2D, this signal read circuit includes a calculating means 11 for calculating the difference between the outputs from the first and second circuit rows SLT and DMY.

Figure 12:
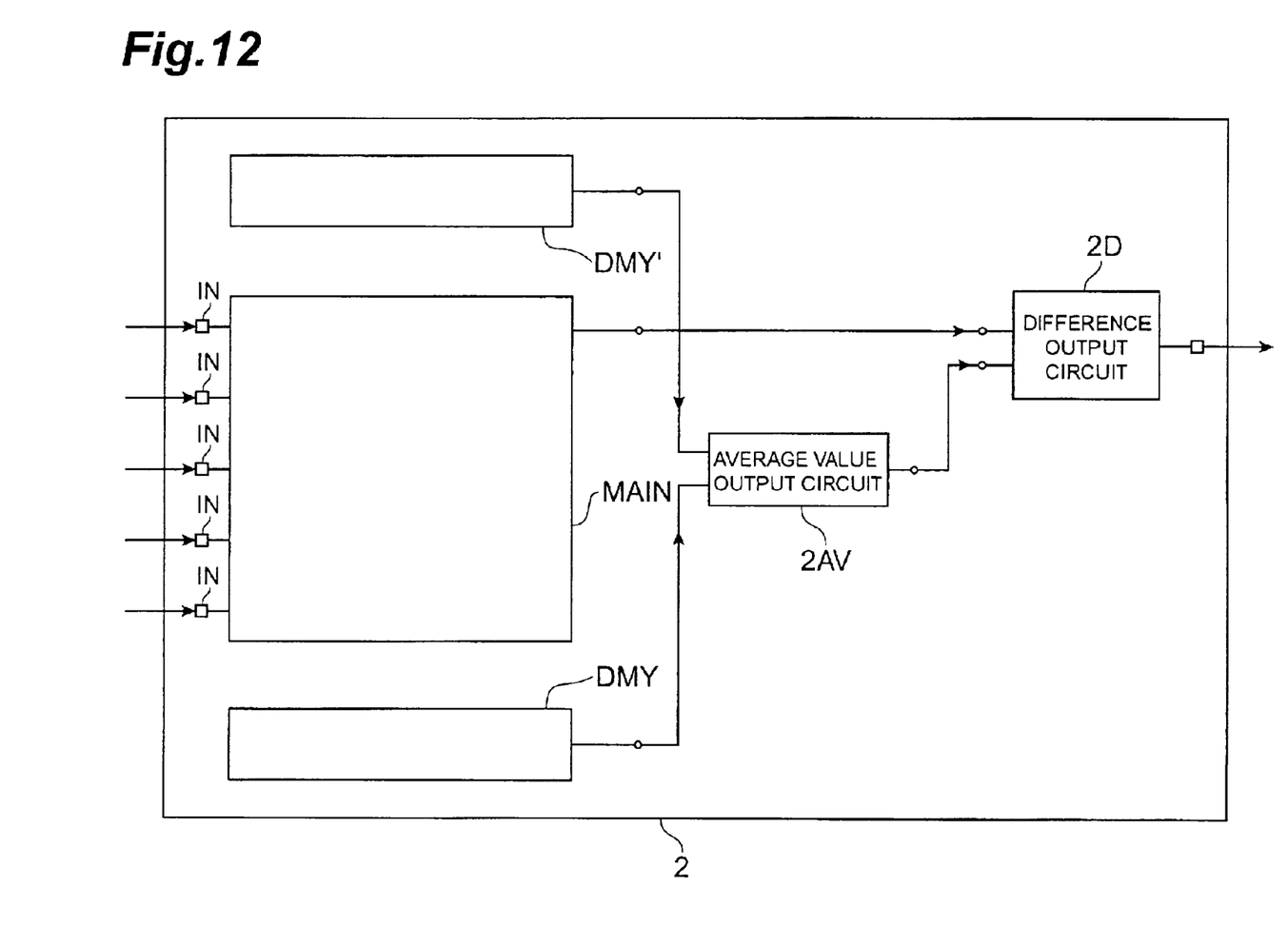
FIG. 12 is a block diagram showing the system configuration of a signal read circuit according to another embodiment.

FIG. 12 is a block diagram showing the system configuration of a signal read circuit according to another embodiment. The signal read circuit of this embodiment is the same as that shown in FIG. 1 except that the circuit includes another dummy circuit row DMY', and the average value of two dummy circuits DMY and DMY' is input to a differential output circuit 2D.

That is, the input terminal of this signal read circuit is open, so no input signal is applied. In addition, the third circuit row (dummy circuit row) DMY' having the same arrangement as a first circuit row SLT is connected in parallel with the first circuit row on the same semiconductor substrate 2. In this embodiment, an output from this third circuit row DMY' having similar output characteristics can be used.

The first circuit row SLT is placed between the second circuit row DMY and the third circuit row DMY'. Therefore, an output from the first circuit row SLT on the semiconductor substrate 2 can be regarded as substantially equal to the average value of the outputs from the second and third circuit rows DMY and DMY'. This suppresses the influence of the positions of these circuit rows.

That is, this signal read circuit includes an average value output circuit 2AV for calculating the average value of the outputs from the second and third circuit rows DMY and DMY', and the differential output circuit 2D for outputting the difference between this average value and the output from the first circuit row SLT. Note that the differential output circuit 2D need not be formed on the same semiconductor substrate. Note also that the difference can also be calculated by inputting these outputs to a calculating means such as a computer.

The semiconductor device according to each of the above embodiments is a line sensor in which the plurality of photodiodes PD are one-dimensionally arranged. However, these photodiodes PD can also be two-dimensionally arranged.

Figure 13:
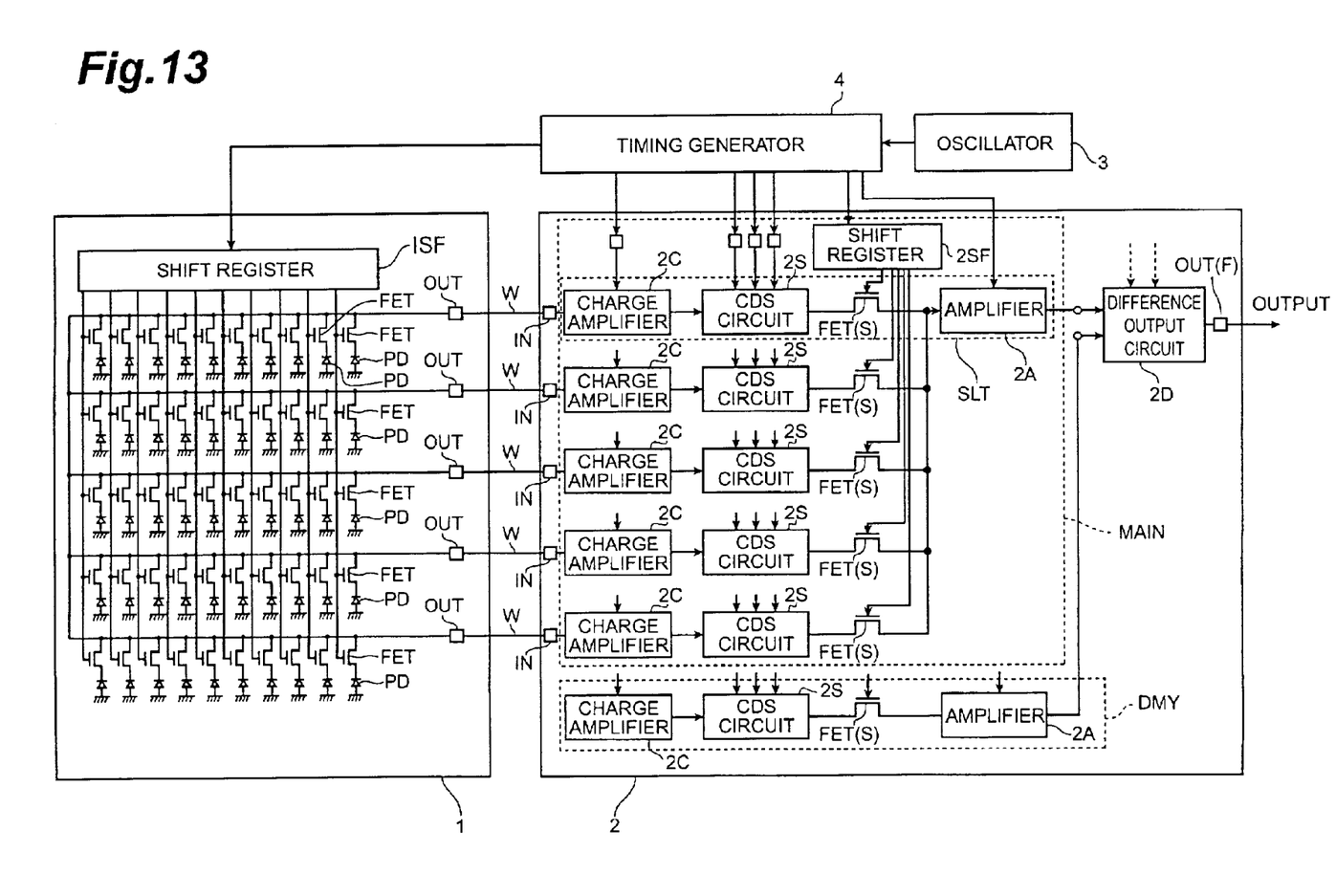
FIG. 13 is a block diagram showing the configuration of a system including a semiconductor device and a signal read circuit according to still another embodiment.

FIG. 13 is a block diagram showing the configuration of a system including a semiconductor device and a signal read circuit according to still another embodiment. In this circuit, the arrangement of the signal read circuit is the same as that shown in FIG. 1, and only the arrangement of the semiconductor device for photoelectric conversion is different from that shown in FIG. 1. The arrangement of each vertical photodiode string is the same as that shown in FIG. 1 except that a switch FET is interposed between each photodiode PD and an output terminal OUT.

By connecting this switch FET, the photodiode PD of each vertical string is connected to the corresponding output terminal OUT to function similar to that shown in FIG. 1. A plurality of such photodiode strings are horizontally arranged adjacent to each other. These vertical photodiode strings horizontally adjacent to each other are sequentially selected by signals from a shift register 1SF. The photodiodes PD of the selected photodiode string are connected to the output terminals OUT. With this configuration, an optical input having a two-dimensional spread can be converted into an electrical signal and output from the output terminals OUT. Note that in this system, the arrangement of the signal read circuit 2 can be modified as in the above embodiments.

The above signal read circuit can be applied to a signal read circuit for reading out an output from a photoelectric conversion element which is a solid-state image sensor such as an image pickup device or a MOS image sensor. More specifically, the above signal read circuit is applicable to a signal read circuit for reading out an output from a photodiode array which monitors light transmitted through an optical fiber by wavelength division multiplexing by demultiplexing the light into a plurality of components.

As described above, the signal read circuit of the present invention can reduce offset variations of an output signal from a photoelectric conversion element.

Industrial Applicability

The present invention can be used in a signal read circuit for reading out a signal from a photoelectric conversion element.

What is claimed is:

1. A signal read circuit comprising:
   a first circuit row having a charge amplifier connected to a photoelectric conversion element and a CDS circuit for performing correlated double sampling for an output from said charge amplifier; and
   a second circuit row having the same arrangement as said first circuit row and connected in parallel with said first circuit row,
   wherein two input terminals of said charge amplifier in said second circuit row are open, and output terminals of said first and second circuit rows are connected to a subsequent circuit such that an offset level generated in said first circuit row decreases.

2. A signal read circuit according to claim 1, characterized in that said subsequent circuit comprises a differential output circuit for outputting a difference between outputs from said first and second circuit rows.

3. A signal read circuit according to claim 2, characterized in that said differential output circuit comprises a differential amplifier circuit which has an operational amplifier having an inverting input terminal, non-inverting input terminal, and output terminal, first and second resistors interposed between the outputs of said first and second circuit rows and said inverting and non-inverting input terminals, respectively, and a third resistor interposed between said output terminal and said inverting input terminal.

4. A signal read circuit according to claim 2, characterized in that said differential output circuit comprises:
   selecting means for selectively connecting the output from said first or second circuit row to one terminal of a capacitor, and
   a switch which, when said selecting means selects one of said first and second circuit rows to one terminal of said capacitor, connects the other terminal of said capacitor to a fixed potential, and, when said selecting means connects the other one of said first and second circuit rows to one terminal of said capacitor, disconnects the other terminal of said capacitor from the fixed potential.

5. A signal read circuit according to claim 1, characterized by further comprising calculating means for calculating the difference between the outputs from said first and second circuit rows.

6. A signal read circuit according to claim 1, characterized in that said first and second circuit rows are formed on the same semiconductor substrate.

7. A signal read circuit according to claim 6, characterized in that a third circuit row having an open input terminal and having the same configuration as that of said first circuit row is connected in parallel with said first circuit row on said semiconductor substrate.

8. A signal read circuit according to claim 7, characterized in that said first circuit row is placed between said second and third circuit rows.

9. A signal read circuit according to claim 8, characterized by further comprising a differential output circuit for outputting a difference between an average value of the outputs from said second and third circuit rows and the output from said first circuit row.

* * * * *